United States Patent
Düll et al.

(10) Patent No.: US 11,994,852 B2
(45) Date of Patent: May 28, 2024

(54) METHOD, CONTROLLER, AND COMPUTER PRODUCT FOR REDUCING OSCILLATIONS IN A TECHNICAL SYSTEM

(71) Applicant: Siemens Aktiengesellschaft, Munich (DE)

(72) Inventors: Siegmund Düll, Munich (DE); Kai Heesche, Munich (DE); Gurdev Singh, Orlando, FL (US); Marc Christian Weber, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 16/763,676

(22) PCT Filed: Nov. 23, 2017

(86) PCT No.: PCT/EP2017/080192
§ 371 (c)(1),
(2) Date: May 13, 2020

(87) PCT Pub. No.: WO2019/101314
PCT Pub. Date: May 31, 2019

(65) Prior Publication Data
US 2020/0371480 A1    Nov. 26, 2020

(51) Int. Cl.
*G05B 5/01*     (2006.01)
*G06N 3/08*     (2023.01)
*G06N 20/00*    (2019.01)

(52) U.S. Cl.
CPC ............. *G05B 5/01* (2013.01); *G06N 3/08* (2013.01); *G06N 20/00* (2019.01)

(58) Field of Classification Search
CPC ........................................... G05B 5/01
See application file for complete search history.

(56) References Cited

U.S. PATENT DOCUMENTS 5,768,476 A * 6/1998 Sugaya ............... G06N 3/0454
706/26
5,784,273 A * 7/1998 Madhavan ............. G05B 5/01
700/175

(Continued)

FOREIGN PATENT DOCUMENTS

| CN | 103377654 A | 10/2013 |
| CN | 105051625 A | 11/2015 |
| JP | H08174379 A | 7/1996 |

OTHER PUBLICATIONS

Ghil et al. "Advanced Spectral Methods For Climatic Time Series", Sep. 2002, Reviews of Geophysics, vol. 40, Issue 1 (Year: 2002).*

(Continued)

*Primary Examiner* — James D. Rutten
(74) *Attorney, Agent, or Firm* — Schmeiser, Olsen & Watts, LLP

(57) ABSTRACT

For reducing oscillations in a technical system plurality of different controller settings for the technical system is received. For a respective controller setting signal representing a time series of operational data of the technical system controlled by the respective controller setting is received, the signal is processed, whereby the processing includes a transformation into a frequency domain, and an entropy value of the processed signal is determined. Depending on the determined entropy values a controller setting from the plurality of controller settings is selected, and the selected controller setting is output for configuring the technical system.

20 Claims, 1 Drawing Sheet

(56) References Cited

U.S. PATENT DOCUMENTS

Figure 1:
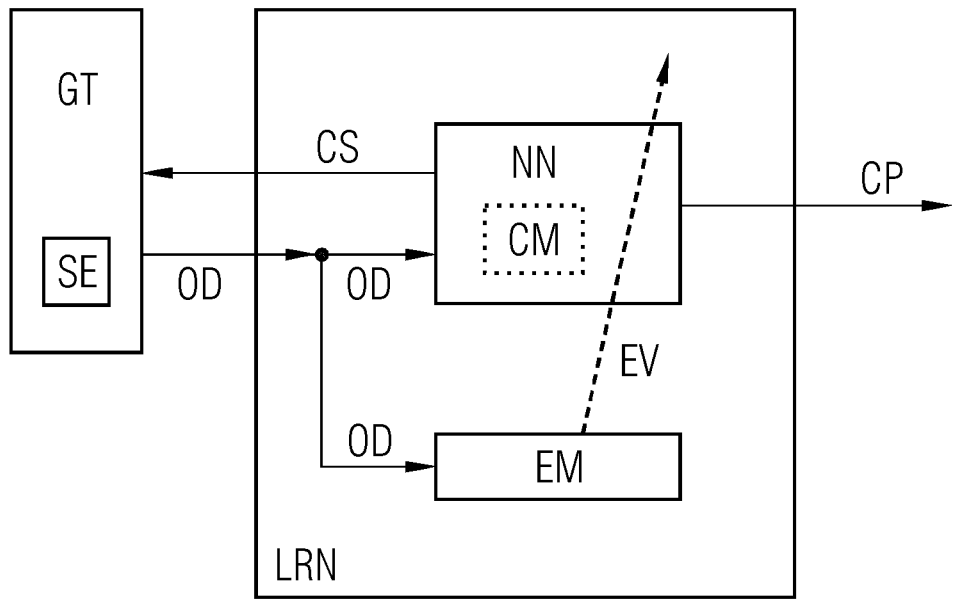

| | | | | |
|---|---|---|---|---|
| 5,796,606 | A * | 8/1998 | Spring | G05B 19/41855 700/9 |
| 6,004,017 | A * | 12/1999 | Madhavan | G05B 5/01 700/175 |
| 6,493,689 | B2 * | 12/2002 | Kotoulas | G10K 11/178 706/23 |
| 8,640,190 | B1 * | 1/2014 | Banerjee | G06F 21/604 726/17 |
| 10,960,539 | B1 * | 3/2021 | Kalakrishnan | G05B 13/027 |
| 2004/0267749 | A1 * | 12/2004 | Bhat | G06F 21/82 707/999.009 |
| 2005/0131592 | A1 * | 6/2005 | Chiang | B64G 1/244 701/13 |
| 2013/0272518 | A1 | 10/2013 | Wu et al. | |
| 2014/0214733 | A1 * | 7/2014 | Alonso | G06N 3/02 706/12 |
| 2015/0192936 | A1 * | 7/2015 | Kelly | G06F 1/206 700/300 |
| 2016/0026491 | A1 * | 1/2016 | Razin | G05B 15/02 718/1 |
| 2016/0040602 | A1 | 2/2016 | Brummel et al. | |
| 2016/0040603 | A1 * | 2/2016 | Dull | G06N 3/006 700/49 |
| 2016/0146195 | A1 * | 5/2016 | Holtom | G01S 17/95 356/28 |
| 2016/0277368 | A1 * | 9/2016 | Narayanaswamy | G06F 21/6209 |
| 2016/0328647 | A1 * | 11/2016 | Lin | G06N 3/08 |
| 2017/0038750 | A1 * | 2/2017 | Düll | G05B 13/027 |
| 2017/0205863 | A1 * | 7/2017 | Lee | G06F 1/3296 |
| 2017/0236337 | A1 * | 8/2017 | Devries | G06F 3/0304 345/419 |
| 2018/0162066 | A1 * | 6/2018 | Bruwer | B33Y 30/00 |
| 2019/0327271 | A1 * | 10/2019 | Saxena | H04L 41/16 |
| 2020/0117817 | A1 * | 4/2020 | Chen | G06F 21/6218 |

OTHER PUBLICATIONS

Pan, Y. N., Chen, J., & Li, X. L. (2009). Spectral entropy: A complementary index for rolling element bearing performance degradation assessment. Proceedings of the Institution of Mechanical Engineers, Part C: Journal of Mechanical Engineering Science, 223(5), 1223-1231 (Year: 2009).*

C. Ji, J. Wang, L. Cao and Q. Jin, "Parameters tuning of model free adaptive control based on minimum entropy," in IEEE/CAA Journal of Automatica Sinica, vol. 1, No. 4, pp. 361-371, Oct. 2014, doi: 10.1109/JAS.2014.7004664. (Year: 2014).*

Seokgoo Kim et al; "Feature Extraction for Bearing Prognostics based on Frequency Energy"; The Journal of The Korea Institute of Intelligent Transport System; vol. 16; No. 2; (Apr. 2017).

Collins Jr E G et al: "Application of Maximum Entropy/Optimal Projection Design Synthesis To a Benchmark Problem", Journal of Guidance and Control and Dynamics, AIAA, Reston, VA, US, vol. 1.15, No. 5, pp. 1094-1102, XP000315233, ISSN: 0731-5090, abstract p. 1094, left-hand column, paragraph first; 1992.

PCT International Search Report and Written Opinion dated Jul. 17, 2018 corresponding to PCT International Application No. PCT/EP2018//080192 filed Nov. 23, 2017.

Pan,Y et al.: "Spectral entropy: A complementary index for rolling element bearing performance degradation assessment. Proceedings of the Institution of Mechanical Engineers"; Part C: Journal of Mechanical Engineering Science, 223(5); pp. 1223-1231; (Year: 2009); 2009.

Liu Yongjian—"Analysis and Design of Modern Electronic Warfare Support and Scout System", National Defense Industry Press.

* cited by examiner

METHOD, CONTROLLER, AND COMPUTER PRODUCT FOR REDUCING OSCILLATIONS IN A TECHNICAL SYSTEM

CROSS-REFERENCE TO RELATED APPLICATIONS

This application claims priority to PCT Application No. PCT/EP2017/080192, having a filing date of Nov. 23, 2017, the entire contents of which are hereby incorporated by reference.

FIELD OF TECHNOLOGY

Complex technical systems like gas turbines, wind turbines, combustion engines, production plants, 3D printers, or power grids usually require sophisticated control strategies or control policies in order to operate the technical system in a productive and stable operating range. In many cases, complex dynamical interactions between various components of the technical system and/or its controllers induce oscillations in the technical system. Such oscillations, however, generally impair the efficiency of the technical system and/or increase its wear.

BACKGROUND

Contemporary controllers for complex technical systems often make use of machine learning methods, for example based on artificial neural networks. Such machine learning methods are usually able to model complex dynamical behavior and to provide efficient control policies for controlling the technical system. However, in many cases the complexity of such control policies gives rise to complex oscillation patterns, which are difficult to reduce or to detect.

SUMMARY

An aspect relates to a method and a controller for a technical system that allow for an efficient reduction of oscillations in the technical system.

For reducing oscillations in a technical system, in particular a gas turbine, a wind turbine, a combustion engine, a production plant, a 3D printer, and/or a power grid, a plurality of different controller settings for the technical system is received. For a respective controller setting a signal representing a time series of operational data of the technical system controlled by the respective controller setting is received, the signal is processed, whereby the processing comprises a transformation into a frequency domain, and an entropy value of the processed signal is determined. Depending on the determined entropy values a controller setting from the plurality of controller settings is selected, and the selected controller setting is output for configuring the technical system.

For executing the inventive method, a controller, a computer program product (non-transitory computer readable storage medium having instructions, which when executed by a processor, perform actions), and a computer readable storage medium are provided.

The inventive method and the inventive controller may be implemented by means of one or more processors, application-specific integrated circuits (ASIC), digital signal processors (DSP), and/or field-programmable gate arrays (FPGA).

One advantage of embodiments of the invention can be seen in an ability to detect and reduce complex and obscured oscillation structures in operational signals of a technical system, where the signals may be subject to a significant noise level and where only a rough estimate of expected oscillation frequencies may be known. In particular, slow oscillations and superimposed oscillations are detectable. The selection of a particular controller setting from a plurality of different controller settings often allows for a reduction of oscillations without access to or knowledge about internals of the controller settings, thus separating a generation of the controller settings from their assessment. Moreover, the entropy value turns out to be a simple and robust selection criterion in many cases. It often allows assessing several hundreds or thousands of different controller settings in acceptable time. The selected controller setting can be permanently implemented in a controller for the technical system, thus configuring and optimizing a control of the technical system.

Particular embodiments of the invention are given by the dependent claims.

According to an advantageous embodiment of the invention, a controller setting resulting in a high or maximum entropy value may be selected in the selection step. A low entropy value of the processed signal in the frequency domain is usually indicative of oscillations. Hence, by selecting a controller setting with a high or maximum entropy value unwanted oscillations may be effectively reduced.

According to a further embodiment of the invention, the controller settings may comprise different control policies for the technical system, the control policies resulting from training one or more control models for the technical system by means of one or more machine learning methods. Such control policies are often referred to as control strategies.

The one or more machine learning methods may employ an artificial neural network, a recurrent neural network, a convolutional neural network, a deep learning architecture, a reinforcement learning method, an autoencoder, a support vector machine, a data-driven regression model, a k—nearest neighbor classifier, and/or a physical model.

According to an advantageous embodiment of the invention, the processing of the signal may comprise determining an autocorrelation of the signal. The autocorrelation specifies a correlation of the signal with itself at pairs of time points i.e., a correlation of the signal with a time-shifted copy of itself. In particular, an autocovariance of the signal may be determined. An autocovariance specifies a covariance of the signal with itself at pairs of time points, and therefore specifies a correlation of the deviations from the mean value for different time shifts. By computing the autocovariance or autocorrelation of the signal, periodic components of the signal are usually amplified compared to residual noise components of the signal, thus improving the detection of oscillations.

Advantageously, the autocorrelation or autocovariance of the signal may be transformed into the frequency domain, by a Fast Fourier Transformation (FFT). A resulting frequency spectrum may be normalized, in particular with respect to its total area that is, by an integral normalization. In the frequency domain, even small periodic components of the signal usually show up as peaks.

According to a further embodiment of the invention, the entropy values may be compared with a threshold value, and the selection of the controller setting may depend on a comparison result. Before the comparison, the entropy values may be normalized, in particular with respect to a maximum possible entropy of the processed signal.

Furthermore, the processing of the signal may comprise subdividing the signal into time segments of a given length. The transformation into the frequency domain and the determination of the entropy value may then be performed for a respective time segment. Accordingly, a determination of the autocorrelation, a normalization of the frequency spectrum, and a normalization of the entropy values may be performed specifically for a respective time segment.

Such a time-segment-specific determination of entropy values allows for tracking time-dependent effects.

Advantageously, an estimate of a periodicity of the signal may be received, and the length of the time segments may be set depending on the received estimate. In particular, a value for a maximum periodicity expected may be received, and the length of the time segment may be set to at least twice the length of that maximum periodicity.

Furthermore, entropy values determined for different time segments may be aggregated by determining an average value, a maximum value, or a minimum value of these entropy values and/or a quantile value of a distribution of these entropy values. The selection of the controller setting may then depend on the aggregated entropy values. Such an aggregation often enhances accuracy in case of noisy signals.

BRIEF DESCRIPTION

Figure 2:
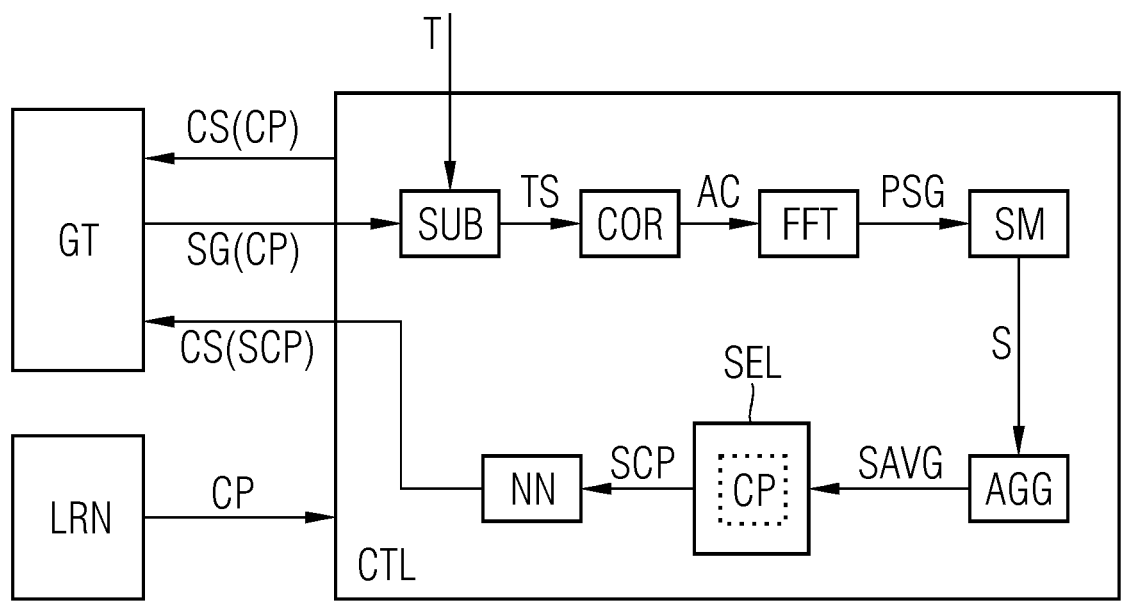

Some of the embodiments will be described in detail, with reference to the following figures, wherein like designations denote like members, wherein:

FIG. 1 a machine learning module for training control models for a technical system; and FIG. 2 an inventive controller for reducing oscillations in the technical system.

DETAILED DESCRIPTION

FIG. 1 illustrates, in schematic representation, a machine learning module LRN for training control models CM for a technical system GT. In the present embodiment, the technical system GT is a gas turbine. Alternatively, or additionally, the technical system GT may comprise a wind turbine, a combustion engine, a production plant, a 3D printer, and/or a power grid.

The gas turbine GT has one or more sensors SE, which measure and provide operational data OP of the gas turbine GT. Such operational data OD may comprise sensor data, physical data (e.g., temperature, pressure, entropy, voltage, or current values), chemical data, control data, performance data, status data, condition data, measurement data, environment data, forecast data, simulated operational data, default data, or other data specifying a status or a property of the technical system GT or being produced by the technical system GT or being produced with regard to the technical system GT. Apart from this, the operational data OD may be acquired from other sources, like control modules, simulation modules, or user terminals of the technical system GT or from other entities related to the technical system GT. According to the present embodiment, the operational data OD are transmitted from the gas turbine GT to the machine learning module LRN.

The machine learning module LRN is data-driven and trainable and implements one or more machine learning methods, in particular a reinforcement learning method, for training one or more control models CM for the gas turbine GT. Actually, many standard machine learning methods are available for performing this training. The machine learning module LRN comprises one or more processors for executing the machine learning methods and one or more memory modules, coupled with the processor, for storing data used by the machine learning methods.

According to the present embodiment, the machine learning module LRN further comprises an artificial neural network NN and an evaluation module EM, to which the received operational data OD are supplied.

The neural network NN implements the one or more trainable control models CM, which are to be trained by means of the above mentioned machine learning methods. The control models CM are aimed to reflect a dynamic behavior of the gas turbine GT and its control as accurate as possible. Each control model CM maps a respective input of operational data OD to control signals CS for controlling the gas turbine GT. Each control model CM should be trained in such a way that the gas turbine GT is controlled by the resulting control signals CS in an optimal way. The control signals CS or signals derived from these are transmitted from the machine learning module LRN to the gas turbine GT for controlling the gas turbine GT.

The evaluation module EM is used to evaluate a status or another property of the gas turbine GT depending on the received operational data OD according to one or more predetermined criteria. As a result, evaluation values EV are output. The predetermined criteria are chosen in such a way that the evaluation values EV are a measure of a desired behavior of the gas turbine GT. In particular, the evaluation module EM may determine from the received operational data OD a performance, a load, a pollution, a resource consumption, a wear and/or another operational parameter of the gas turbine GT, and may output this or these parameters as evaluation values EV.

The control models CM are trained by means of received operational data OD and the evaluation values EV from the evaluation module EM. The training is aimed at optimizing the evaluation values EV. For this purpose, the evaluation values EV resulting from controlling the gas turbine GT by the control signals CS, are returned to the neural network NN—as indicated by a dashed arrow in FIG. 1—and the control models CM are adapted in order to optimize the evaluation values EV and thus to optimize an desired behavior of the gas turbine GT. For the adaptation of the control models CM, many standard machine learning methods may be used.

The control models CM may each be trained under many different operational conditions of the gas turbine GT. Then, from each successfully trained control model CM and for each operational condition, a specific control policy CP can be extracted. These control policies CP can be used as controller settings for configuring and/or controlling the technical system GT. In practice, several hundreds of trained control policies CP may be generated in such a way.

The generated control policies CP are output by the machine learning module LRN. According to embodiments of the invention, the generated control policies CP are to be examined with regard to their tendency for oscillations. After that, a specific control policy showing particular low oscillations is selected from all generated control policies for actually configuring and/or controlling the technical system GT.

FIG. 2 illustrates, in schematic representation, an inventive controller CTL for reducing oscillations in the technical system GT. Reference signs in FIG. 2 which are identical to those in FIG. 1 denote the same entities, which are embodied as described above.

The controller CTL may be part of the technical system GT or implemented at least partially separated from the technical system GT. The controller CTL comprises one or more processors for executing all method steps of the controller CTL and one or more memory modules, coupled with the processor, for storing data used by the controller CTL.

The controller CTL receives from the machine learning module LRN a multitude of control policies CP usable as controller settings for configuring and/or controlling the technical system GT. The machine learning module LRN may be implemented separately from the controller CTL or may be at least partially comprised by it.

For each respective control policy CP of the multitude of control policies, the controller CTL controls the technical system GT by means of control-policy-specific control signals CS(CP) and respectively receives control-policy-specific operational signals SG(CP) from the technical system GT. The operational signals SG(CP) represent a respective time series of control-policy-specific operational data, the latter being specified as above. Control-policy-specific means that the control signals CS(CP) are generated by means of the respective control policy CP and that the operational signals SG(CP) result from controlling the technical system GT by the respective control policy CP. The operational signals SG(CP) may stem from sensors or other sources of operational data of the technical system GT.

The controller CTL further receives an estimate of a maximum periodicity T of the operational signals SG(CP). The estimate T may be received from a user or from a technical specification, or may be determined otherwise.

For processing the operational signals SG(CP) for each respective control policy CP, the controller CTL comprises a subsampling module SUB, a correlation module COR, and a transformation module FFT. Furthermore, the controller CTL comprises an entropy module SM, an aggregation module AGG, a selection module SEL, and an artificial neural network NN.

The sub sampling module SUB is supplied with the maximum periodicity T and with the operational signals SG(CP). For each control policy CP, the subsampling module SUB subdivides a respective operational signal SG(CP) into time segments TS of given length. Such time segments are often denoted as subsamples. According to the present embodiment, the length is set depending on the maximum periodicity T, in particular to a value greater or equal to T or to a value greater or equal to 2*T.

The time segments TS are transmitted from the sub sampling module SUB to the correlation module COR. The correlation module COR determines an autocovariance function AC of each respective time segment TS for each respective control policy CP. The autocovariance function AC may be regarded as a kind of autocorrelation and may be determined as a correlation of the deviations from the mean value of the respective time segment TS for different time shifts. By computing the autocovariance functions AC of the time segments TS, periodic components within the time segments TS are usually amplified compared to residual noise components, thus improving the detection of oscillations.

The autocovariance functions AC are transmitted from the correlation module COR to the transformation module FFT. The transformation module FFT transforms each autocovariance function AC into a frequency domain by performing a discrete Fourier transformation resulting in a frequency spectrum for each respective time segment TS and each respective control policy CP. For this, a standard fast Fourier transformation procedure may be used. The resulting frequency spectra are each normalized, in particular by their total area i.e., by an integral normalization. The combination of the above processing steps, in particular applying the autocovariance function and normalizing the resulting frequency spectra increases the robustness and performance of the inventive method.

Each normalized frequency spectrum is transmitted as a processed signal PSG from the transformation module FFT to the entropy module SM. The entropy module SM determines an entropy value S of the processed signal PSG for each respective time segment TS and each respective control policy CP in order to assess an oscillatory tendency of the respective control policy CP.

A respective entropy value S is determined by first calculating a Shannon entropy S0 of a respective processed signal PSG e.g., according to $$S0 = -\Sigma p_i * \log_{10}(p_i),$$

where $p_i$ is an amplitude of the i-th frequency bin in the respective normalized frequency spectrum PSG and the sum runs over all bins of that spectrum. After that, the Shannon entropy S0 is normalized with regard to a maximum possible entropy of a frequency spectrum with the given length. The result of that normalization gives the entropy value S, which is a scalable measure of uniformity of the respective normalized frequency spectrum PSG. That is, the lower the entropy value S is, the more likely it is that the respective time segment TS exhibits some oscillation pattern.

For each respective time segment TS and each respective control policy CP, the respective entropy value S is transmitted from the entropy module SM to the aggregation module AGG. The aggregation module aggregates the entropy values S for all time segments TS of a respective control policy CP, in particular by determining an average, a maximum, a minimum, or a quantile of the entropy values S involved. This results in an aggregated entropy value SAVG for each respective control policy CP. The aggregated entropy value SAVG allows an overall assessment of a respective control policy CP by a single scalar measure.

For each respective control policy CP, the aggregated entropy value SAVG is transmitted from the aggregation module AGG to the selection module SEL. The latter is used for selecting from the multitude of stored control policies CP one or more control policies SCP which exhibit particular low oscillations. According to the present embodiment, the control policy with a maximum aggregated entropy value SAVG is determined and output as selected control policy SCP.

Alternatively, or additionally, the entropy values S and/or the aggregated entropy values SAVG may be compared with a predefined threshold value in order to tag a respective control policy CP and/or a respective time segment TS as oscillatory or not. The selection may then depend on the comparison results or the tagging.

The selected control policy SCP is transmitted from the selection module SEL to the neural network NN and configures a control model of the neural network NN. The neural network NN then generates control signals CS(SCP) according to the selected control policy SCP and outputs them to the technical system GT for controlling the technical system GT.

As low entropy values in the frequency domain are usually indicative of oscillations or time periodicity in the underlying operational signal, the selection and application of a control policy SCP which induces maximum entropy effectively reduces oscillations in the technical system GT.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. A method for configuring a technical system and reducing oscillations, the method comprising:
   a) receiving a multitude of different control policies for the technical system, wherein each respective control policy results from training one or more control models for the technical system by using one or more machine learning methods, wherein the multitude of different control policies includes at least one hundred different control policies,
   b) controlling the technical system with each of the respective multitude of different control policies,
   c) receiving a respective signal, one for each of the multitude of different control policies, each of the respective signals representing a time series of operational data of the technical system controlled by a respective one of the multitude of different control policies,
   d) processing each of the respective signals, the processing comprising a transformation into a frequency domain, wherein the processing further comprises determining an autocovariance function, and
   e) determining an entropy value for each of the respective processed signals,
   f) comparing the determined entropy value for respective control policies, wherein comparing includes comparing the determined entropy value for respective control policies with determined entropy values for other respective control policies, and selecting a control policy controller setting from the multitude of different control policies depending on the comparing, and
   g) outputting the selected control policy controller setting and configuring the technical system by permanently implementing the outputted selected control policy controller setting in a controller of the technical system.

2. The method according to claim 1, wherein in the selection step a control policy controller setting resulting in a high entropy value is selected.

3. The method according to claim 1, wherein the technical system comprises a gas turbine, a wind turbine, a combustion engine, a production plant, a 3D printer, and/or a power grid.

4. The method according to claim 1, wherein the one or more machine learning methods employ an artificial neural network, a recurrent neural network, a convolutional neural network, a deep learning architecture, a reinforcement learning method, an autoencoder, a support vector machine, a data-driven regression model, a k—nearest neighbor classifier, and a physical model.

5. The method according to claim 1, wherein the determined entropy value for respective control policies is also compared with a predetermined threshold.

6. The method according to claim 5, wherein the autocovariance of the signal is transformed into the frequency domain.

7. The method according to claim 1, wherein the processing of the signal comprises subdividing the signal into time segments of a given length, and
   the transformation into the frequency domain and the determination of the entropy value are performed for a respective time segment.

8. The method according to claim 7, wherein an estimate of a periodicity of the signal is received, and
   the length of the time segments is set depending on the received estimate.

9. The method according to claim 7, wherein entropy values determined for different time segments are aggregated by determining an average value, a maximum value, or a minimum value of these entropy values and/or a quantile value of a distribution of these entropy values, and
   the selection of the controller setting depends on the aggregated entropy values.

10. The method of claim 1, further comprising training the multitude of different control models for the technical system by a machine learning module by using the one or more machine learning methods and extracting a control policy for each of the trained control models.

11. The method of claim 10, wherein each of the multitude of different control models are trained using operational data where evaluation values that are a measure of a desired behavior of the technical system are output.

12. The method of claim 11, wherein the evaluation values represent at least one of a performance, a load, a pollution, a resource consumption, and a wear of the technical system.

13. The method of claim 11, wherein each of the multitude of different control models are trained to optimize at least one of the evaluation values.

14. The method of claim 10, further comprising outputting each of the multitude of control policies by the machine learning module.

15. The method according to claim 1, further comprising subdividing each of the respective signals into time segments of a given length.

16. A controller for reducing oscillations in a technical system, the controller being configured to perform a method for configuring the technical system and reducing oscillations, the method comprising:
   a) receiving a multitude of different control policies for the technical system, wherein each respective control policy results from training one or more control models for the technical system by using one or more machine learning methods, wherein the multitude of different control policies includes at least one hundred different control policies,
   b) controlling the technical system with each of the respective multitude of different control policies,
   c) receiving a respective signals, one for each of the multitude of different control policies, each of the respective signals representing a time series of operational data of the technical system controlled by a respective one of the multitude of different control policies,
   d) processing each of the respective signals, the processing comprising a transformation into a frequency domain, wherein the processing further comprises determining an autocovariance function, and
   e) determining an entropy value for each of the multitude of different processed signals,
   f) comparing the determined entropy value for respective control policies, wherein comparing includes comparing the determined entropy value for respective control policies with determined entropy values for other respective control policies, and selecting a control policy controller setting from the multitude of different control policies depending on the comparing, and g) outputting the selected control policy controller setting and configuring the technical system by permanently implementing the outputted selected control policy controller setting in a controller of the technical system.

17. The controller according to claim 16, wherein the determined entropy value for respective control policies is also compared with a predetermined threshold.

18. A computer program product, comprising a computer readable hardware storage device having computer readable program code stored therein, said program code executable by a processor of a computer system to implement a method for configuring a technical system and reducing oscillations the method comprising:
 a) receiving a multitude of different control policies for the technical system, wherein each respective control policy results from training one or more control models for the technical system by using one or more machine learning methods, wherein the multitude of different control policies includes at least one hundred different control policies,
 b) controlling the technical system with each of the respective multitude of different control policies,
 c) receiving a respective signals, one for each of the multitude of different control policies, each of the respective signals representing a time series of operational data of the technical system controlled by a respective one of the multitude of different control policies,
 d) processing each of the respective signals, the processing comprising a transformation into a frequency domain, wherein the processing further comprises determining an autocovariance function, and
 e) determining an entropy value for each of the multitude of different processed signals,
 f) comparing the determined entropy value for respective control policies, wherein comparing includes comparing the determined entropy value for respective control policies with determined entropy values for other respective control policies, and selecting a control policy controller setting from the multitude of different control policies depending on the comparing, and
 g) outputting the selected control policy controller setting and configuring the technical system by permanently implementing the outputted selected control policy controller setting in a controller of the technical system.

19. The computer program product according to claim 18, wherein the determined entropy value for respective control policies is also compared with a predetermined threshold.

20. A computer readable storage medium comprising a computer program product according to claim 18.

* * * * *